Sept. 20, 1960  W. F. ALLER ET AL  2,952,919
GAUGING DEVICE

Filed May 28, 1953  3 Sheets-Sheet 1

INVENTOR.
W. F. Aller
R. A. Mahlmeister
BY
Edward J. Noe Jr.
atty.

Sept. 20, 1960 W. F. ALLER ET AL 2,952,919
GAUGING DEVICE
Filed May 28, 1953 3 Sheets-Sheet 3

INVENTOR.
W. F. Aller
BY R. A. Mahlmeister
Edward J. Noe
atty

United States Patent Office 2,952,919
Patented Sept. 20, 1960

2,952,919
GAUGING DEVICE

Willis Fay Aller and Raymond A. Mahlmeister, Dayton, Ohio, assignors, by mesne assignments, to The Sheffield Corporation, a corporation of Delaware Filed May 28, 1953, Ser. No. 358,092

3 Claims. (Cl. 33—174)

This invention relates to a method of and apparatus for precisely gauging parts, which method and apparatus are also adapted for the provision of calibrated masters for use in setting up gauging devices.

It is an object of this invention to provide a method of and apparatus for gauging the relative dispositions in space of points on a part surface.

It is a further object to provide a method of and apparatus for precisely relatively positioning a gauging member from point to point along a part surface for determining the relative point locations along the part surface, and gauging the relative point dispositions along gauging axes passing through the part surface at the relative point locations.

It is a further object to provide a method of and apparatus for quickly and accurately gauging irregularly shaped parts by direct comparison with theoretical perfect dimensions.

It is a further object to provide a method of and apparatus for cheaply and accurately calibrating gauging points on work parts such as turbine or compressor blades, adapting such parts for use as gauge setting masters and whereby precision masters exactly fashioned to all dimensions are rendered unnecessary.

It is a further object to provide a method for calibrating a point on the surface of a work part such as a turbine or compressor blade by placing a gauging device at the selected point on the part surface as determined by locating coordinates and gauging the disposition of the point relative to its theoretical location along a measuring coordinate passing through the part surface.

It is a further object to provide an apparatus having means for carrying a part in a reference position and including setup provisions whereby a gauge head can be precisely located relative to a reference point or the like of the part for gauging the disposition of the selected point on the surface of the part with respect to the part reference point.

It is a further object to provide an apparatus as referred to in the object next above including carrying means for the gauge head adapted for the substitution therein of a marking means for marking on the part surface the location of the point gauged.

Other objects and advantages of the invention will be apparent from the following description, the appended claims, and the accompanying drawings, in which:

Figure 3:
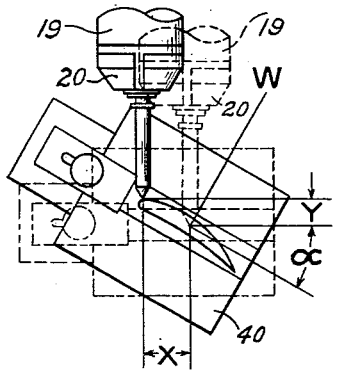
Figure 4:
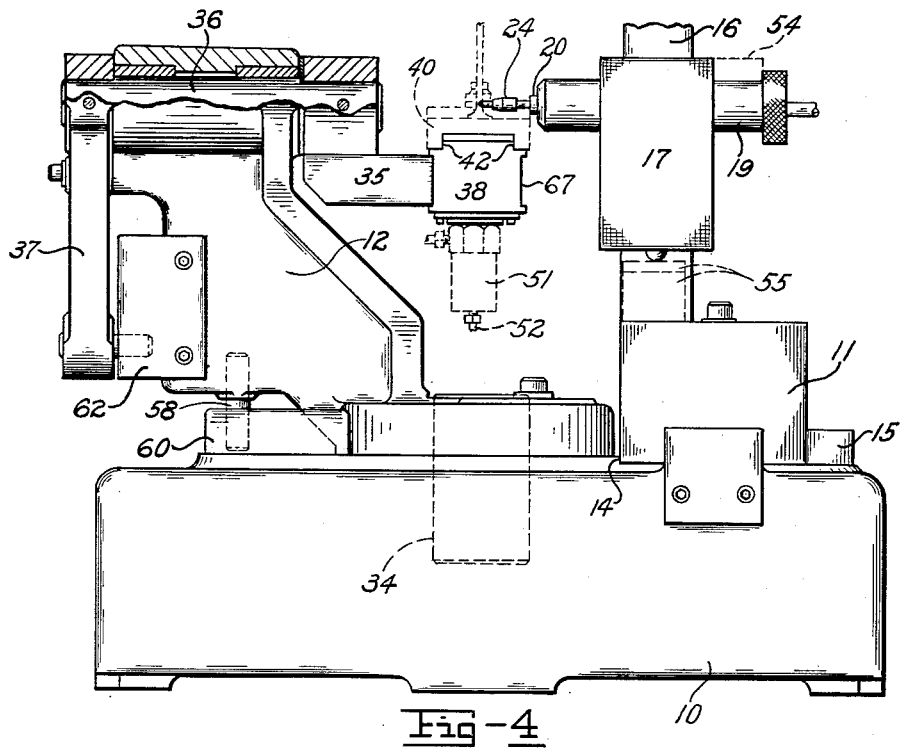
Figure 5:
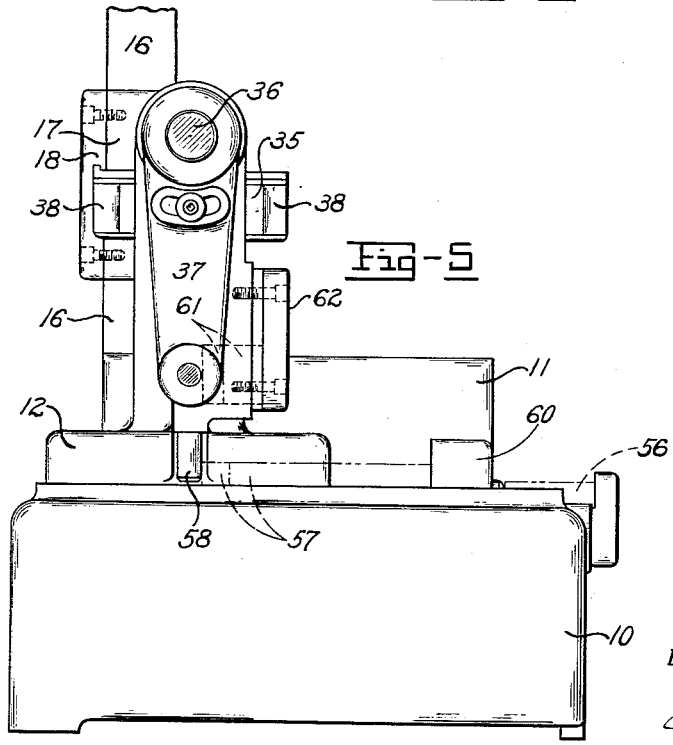
Figure 9:
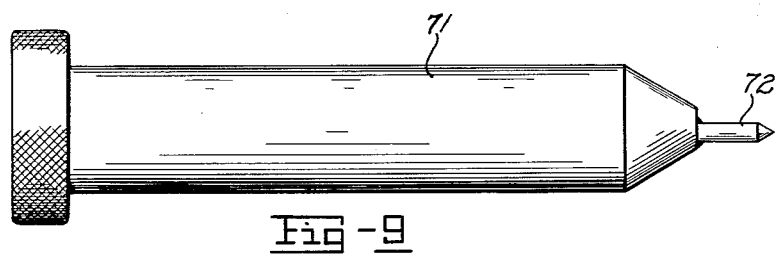
Figure 8:
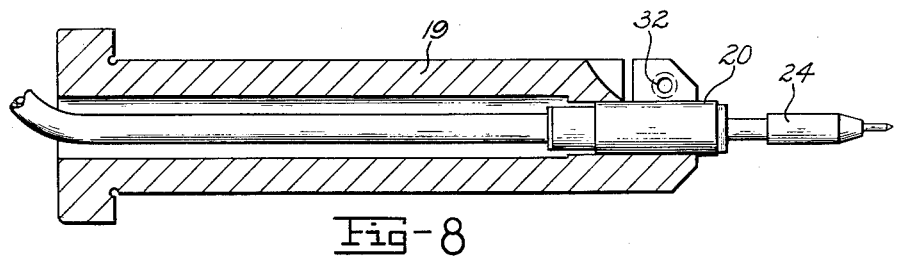
Figure 6:
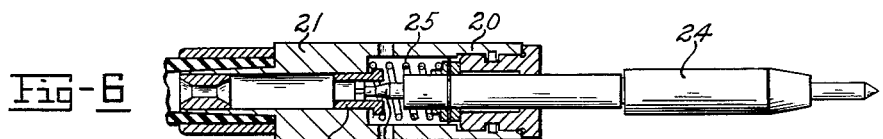
Figures 7, 10:
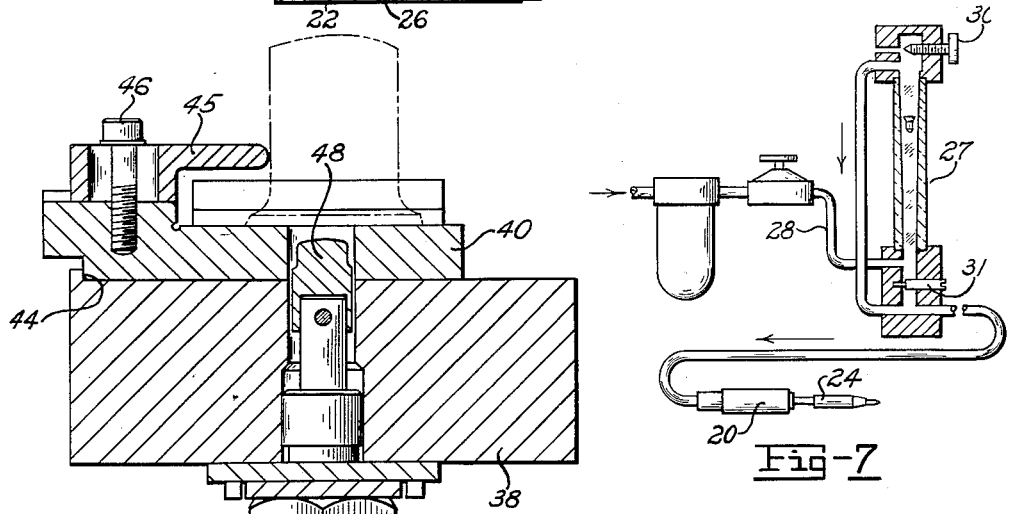

Figure 3 illustrates the blade holder and gauge head adjustments of the apparatus, Figure 4 is a side view of the apparatus, Figure 5 is an end view of the apparatus looking along one of the pivot axes, Figure 6 discloses, in section, an exemplary gauge head for making the necessary measurements, Figure 7 discloses such a gauge head connected to an air flow measuring instrument, Figure 8 illustrates a gauge head mounted in a suitable housing, Figure 9 illustrates a scribing device, and Figure 10 discloses, in section, a blade holding fixture and a clamping device.

This invention provides a method for determining the relative dispositions in space of points on a part surface. A gauging member is placed in association with the surface of the part at each of the respective points to be gauged and is positioned to gauge the disposition of each of the points along a measuring coordinate passing through the part surface, this coordinate being one of the coordinates defining the point positions in space. The movements of the gauging member along the other of the space position defining coordinates in its movement from point to point is precisely determined and in conjunction with the gauging operation along the gauging coordinate will precisely define the relative point dispositions.

Previously it has been the general practice to make masters to the precise form and dimensions required for use in setting up gauging devices which gauging devices are then used to check, by comparison, contours and dimensions of work parts. Because of the extremely high degree of precision necessary in fashioning such masters, particularly for parts of complex shape such as turbine or compressor blades, the process has been expensive and time consuming. These blade masters have generally been checked for exactness indirectly against theoretical dimensions, as by optical projection methods by comparison with contours which are drawn from the theoretical part dimensions. Such as indirect process does not result in perfect masters, first, because the drawn contours are subject to human errors and drawn with a certain amount of unavoidable discretion on the part of the draftsman and second, because of errors in the checking procedure, be it optical or otherwise. In this invention selected gauging points on a part can be gauged by direct comparison with theoretical perfect dimensions and parts can be inexpensively and quickly calibrated for use as gauge setting masters.

While the method and apparatus of this invention will now be disclosed as applied to the gauging and calibration of a turbine or compressor blade, it is to be understood that the teachings of this invention can be applied to the gauging, for calibration purposes or otherwise, of materially different workpieces.

As applied to a calibration operation the method of this invention involves situating a workpiece and a gauging member initially in a reference association and then, by interpolating the theoretical blueprint dimensions into setup dimensions, relatively positioning the workpiece and the gauging member to give a predetermined gauging indication at the theoretical location of a selected point on the part surface, determining the error in the disposition of the part surface at that point by the deviation of the actual gauging indication from the predetermined theoretical indication, recording the error and marking its point location on the part surface.

The principal of the blade calibration operation in the illustrated example is based on the fact that generally such blades are dimensioned about a known point and that therefore the theoretical coordinates and dimensions relative to that point can be interpolated by calculation into X and Y components and necessary pivot movements to be used as setup dimensions in comparing the actual point locations with respect to their theoretical locations.

Figure 1:
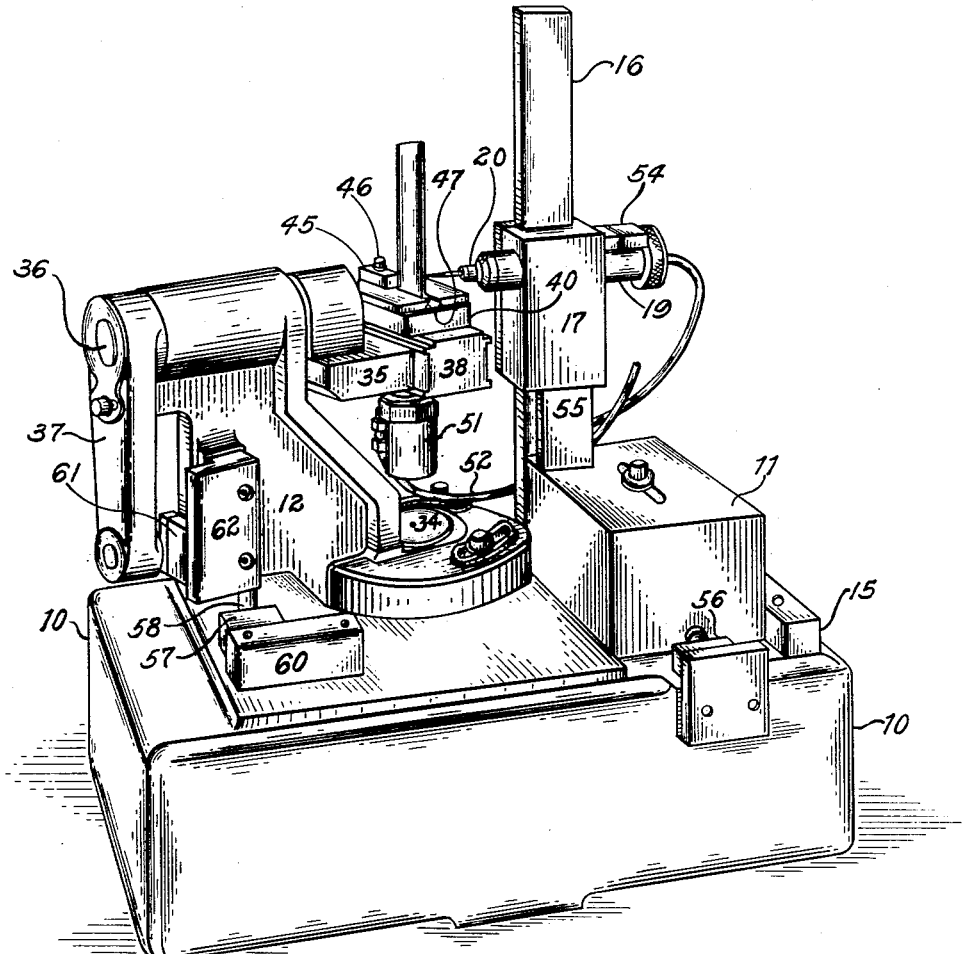
Figure 1 is a perspective view of an apparatus for carrying out the present invention.

Figures 1, 4 and 5 disclose an apparatus for carrying out the method. As therein disclosed the major components comprise a base member 10, an adjustable block 11 which carries the gauging member, and a pivot frame 12, which carries the work part to be gauged, in this case a blade. This pivot frame 12 carries a support upon which the work is mounted. While it could be a flat surface upon which the work is clamped by any suitable means, in the example herein illustrated where the work part is a blade a suitable blade mounting fixture and a fixture mounting block have been provided.

The adjustable block 11 is guided for sliding movement widthwise (along the X axis of the apparatus) in a groove 14 and along a guide rail 15. This block 11 has fastened at one corner thereof a vertical rail 16 which carries a slide block 17 for sliding vertical movement therealong. This slide block 17 has a cap 18 (see Figure 5) which fastens it about the vertical rail 16. The slide block 17 has a hole therethrough along the length of the apparatus (and along the Y axis of the apparatus) into which a gauge head housing 19 is inserted.

This housing 19 is shown in section in Figure 8 with a gauge head 20 mounted therein. The gauge head 20 is shown in section in Figure 6 and as therein illustrated comprises principally a body portion 21 which supports an orifice forming sleeve 22 and a work positioned plunger 24. Movement of the plunger against the compression of the spring 25 positions an orifice controlling surface 26 and determines its relationship to one end of the orifice forming sleeve 22 and the flow of fluid under pressure through the gauge head 20. The association of the gauge head 20 with a flow measuring instrument 27 is shown in Figure 7. Air is supplied to the instrument 27 through a conduit 28 and flows up through an internally tapered transparent tube and downward to the gauge head where its flow is controlled in accordance with work controlled movements of the plunger 24. An indicator positions itself along the tube length in accordance with work controlled flow. An adjustment 30 is provided to vary the bleed to atmosphere at the upper end of the tube in the instrument 27 to allow positioning of the indicating element as desired. An additional adjustment is provided at 31 to bypass air from the supply conduit 28 directly to the gauge head without passing through the tube and this adjustment controls the amplification of the instrument 27. The gauge head 20 can be positioned along the axis of the housing 19 as desired and clamped therein by a screw which is threaded, as shown at 32, Figure 8, across a split end portion of the housing.

The fixture pivot frame 12 is pivoted for movement about the pivot pin 34 seated in the base 10. It carries an arm 35 for pivoting about the horizontal axis of a pivot shaft 36; a pivot arm 37 extends downward from the pivot shaft 36 at its outer end. A fixture mounting block 38 is carried at the outer end of the pivot shaft supported arm 35. The fixture mounting block 38 is designed to support various blade holding fixtures an example of which is shown at 40. These blade holding fixtures are designed for each specific blade type to be gauged. The blade holding fixture 40 is so designed that when located laterally by the surface 42 (see Figure 4) on the fixture mounting block 38 and longitudinally against the surface 44 on the block 38 with its adjustable projection 45 properly positioned and fastened by the screw 46, it is adapted to position a blade with the reference point about which it is constructed at the intersection of the axes of the pivot pin 34 and the pivot shaft 36 of the apparatus. The blade to be gauged and calibrated is clamped against surfaces in the fixture 40 as shown at 47 in Figure 1 (one of which appears in Figure 10) by a plunger 48 controlled by a piston 50 situated in an air cylinder 51. Metering of air under pressure to the lower conduit 52 leading to the cylinder 51 will raise the plunger, engaging it up against the lower end of the blade to carry it up into contact with these inclined surfaces 47. When the blade is so clamped in the fixture 40 the blade reference point is at a predetermined position in the apparatus.

By the utilization of gauge blocks both the gauge head 20 and the blade can be precisely positioned in the apparatus. The gauge head housing 19 is positioned along the Y axis of the apparatus by inserting gauge blocks at 54 between the head on the gauge head housing 19 and the end face of the vertical slide block 17. The vertical slide block itself can be vertically positioned by inserting gauge blocks as shown at 55, and positioned laterally of the apparatus along the X axis by gauge blocks inserted at 56. The blade itself can be pivoted about a vertical axis passing through its reference point by the insertion of gauge blocks at 57 between a downward projection 58 on the pivot frame 12 and a reference surface 60 mounted on the base 10. The blade can be pivoted about an axis passing horizontally through its reference point by insertion of gauge blocks as at 61 between a projection on the pivot arm 37 and a reference surface 62 mounted on the side of the pivot frame 12.

Figure 2:
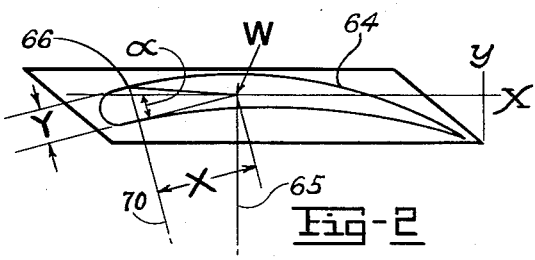
Figure 2 illustrates basically the dimensions about which an exemplary blade is constructed and the interpolated setup dimensions which are necessary.

The steps in the derivation of the setup dimensions from the theoretical dimensions and the necessary adjustments of the apparatus will be described with particular reference to Figures 2 and 3. The blade 64 of Figure 2 in this example is basically dimensioned or constructed about polar coordinates. That is to say, each point on its surface, and a reference point W, are located theoretically by an angle back from the blade leading edge and a radial measurement from a center point. The symbol W in Figure 2 designates the blade reference point about which all other points are referenced. It is fixed along a radius 65 at a given radial distance from a center which would be towards the lower end of that sheet of drawing and at a given angular displacement about that center back from a radius passing tangent to the leading edge of the blade section. For purposes of illustration a point 66 is selected on the blade surface and the steps in interpolating the theoretical dimensions into setup dimensions for the apparatus are shown graphically. However, in practice blueprint theoretical dimensions are directly interpolated into setup dimensions by calculation and are set into the apparatus disclosed with gauge blocks.

As previously mentioned when the blade is inserted against the element 45 of the blade holding fixture 40 and is clamped up against the reference surfaces 47, it is fixed in a predetermined reference position on the fixture mounting block 38 with its reference point W at a known position therein and at the intersection of the apparatus pivot axes. The first step in a gauging and calibrating procedure is to position the gauge head 20 to get a predetermined gauging indication when the gauge head work contactor 24 is located along locating coordinates relative to the part surface for a measurement along the measuring coordinate 65 at the part reference point W. This is of course physically impossible in this instance because the point W is within the confines of the blade surface. However, in each application the work mount- the fixture 40 is so designed as to situate the blade reference point at a given distance inward from the reference surface 67 on the fixture mounting block 38. Suitable reference gauge block inserts are positioned at 56, 57 and 61 to align the axis of the pivot shaft 36 (and the radius 65) along the Y axis of the apparatus with the pivot arm 37 vertical and with the hole through the slide block 17 and the axis of shaft 36 in the same vertical plane. Assuming that initially the gauge head 20 and the instrument 27 have been properly calibrated the gauge head 20 is mounted in the gauge head housing 19. The housing 19 is inserted into the hole in the slide block 17 and the axis of shaft 36 in the same with the adjustable block 11. A gauge block build-up equaling the Y displacement between the point W and the surface 67 is inserted at 54, the gauge head 20 is then adjusted along the length of the gauge head housing 19 while the work contactor 24 is in contact with the reference surface 67 of the fixture mounting block 38 until a given intermediate indication of the gauge instrument 27, as for example an indication at an intermediate "zero" on the instrument scale, is obtained. The gauge head 20 is then clamped in the gauge head housing 19 and the initial setup step has been accomplished. Thus it is seen that if the gauge block insert at 54 is removed, the gauge head moved in, and the slide block 17 properly elevated by the insertion of gauge blocks at 55 to the height of the axis of shaft 36 the gauge head work contacting element 24 would be situated for a "zero" instrument indication at the part reference point W.

The second step in this procedure is to relatively position the gauge head and the blade so that the instrument will give the predetermined indication at the theoretical disposition of the selected point on the blade surface. Continuing with the example of point 66 in Figure 2 note that this point is positioned along a radius 70 and at an angle from the blade leading edge. It is desired, of course, to situate the gauge head along this radius 70 so that it will be gauging along the measuring coordinate. A line through the reference point W and the perpendicular to the radius 70 is shown. The angle between this perpendicular and a line between the blade reference point W and the point 66 would be the necessary angular adjustment "alpha" about the pivot 34 from the previously mentioned apparatus setup position. A suitable gauge block insert is made at 57 to obtain this angle. With the blade positioned about the vertical axis passing through its reference point W to the angle "alpha" the line through the point W perpendicular to the radius 70 is now aligned with the X axis across the base 10. It is then readily seen that in order to secure the predetermined "zero" reading of the gauge instrument with the work contactor 20 gauging the selected point 66 on the blade surface it would be necessary to move the gauge head, by inserting a build-up at 54 along the apparatus Y axis, through the distance Y as designated in Figure 2, and to move the gauge head along the apparatus X axis by sliding the block 11 and inserting a suitable build-up at 56 to move the gauge head through the displacement X as indicated in Figure 2. The proper vertical build-up is included at 55 for the blade level being gauged. With this setup thus accomplished the instrument will indicate zero if the point on the blade surface is perfectly disposed relative to the part reference point W. However, if it is not so disposed the instrument will indicate precisely the difference in a plus or minus sense along the measuring coordinate, therefore determining the error in the disposition of the point.

Figure 3 illustrates in phantom the housing 19 and the gauge head 20 positioned with its work contactor at the part reference point W. In solid outline are shown the gauge head housing 19 and the blade mounting fixture 40 as they would appear when the necessary adjustments have been accomplished.

After the deviation of the point along the measuring coordinate has been determined, it is suitably noted by the operator. Then a scribing element 71 is substituted in the hole in the slide block 17. This scribing element is illustrated in Figure 9 and has an off center point 72. When this point is brought into contact with the blade and the element 71 rotated a circle is scribed about the calibrated point. This procedure can be repeated for as many points as it is desired to calibrate on the part surface. Only one set-up step in conjunction with reference surface 67 is necessary for each side of the blade gauged.

If the blade has an inclination in a general chordwise direction relative to its base a suitable adjustment can be provided by inserting gauge block build-ups at 61 to position the arm 37 and pivot the shaft 36 about its axis. In the illustrative example this adjustment has not been necessary.

Usually such a calibrated blade is mounted in a reference position in a gauging device for set-up purposes and gauging elements are brought into contact with these calibrated points and adjusted until their associated indicators give the repective error indications. The indicators of the gauging device would then indicate zero if a perfect blade were so positioned. Thus the gauging device will indicate how much subsequent blades being gauged vary with respect to a perfect blade at all points of check.

It will be apparent that although an example using polar theoretical coordinates has been employed rectangular and other coordinate systems can be also interpolated into set-up dimensions. The method is adapted for the gauging and/or calibration of blades and other parts of irregular configuration and of varying sizes. A flat part supporting platform could be provided for universal use or by simple changes in the design of the work mounting fixtures, any part can be positioned for a gauging or calibrating operation. Air, mechanical, electrical or other gauging heads could be employed.

Thus it is seen that an apparatus and a method has been provided which allows the accurate gauging of parts of irregular shapes and also the calibration thereof for use in setting up gauging devices as desired. The method allows the direct measurement of the disposition of the selected points with reference to theoretical dimensions without intermediate steps which might lead to errors in the gauging operation. Parts exactly calibrated at the necessary gauging points are readily provided for use in setting up gauging devices and it is not necessary to provide precision masters exactly fashioned to all dimensions for such purposes.

What is claimed is:

1. An apparatus for use in gauging and calibrating the relative dispositions of a plurality of selected points on the contour of a part such as a turbine blade or the like, comprising a base, a support for the part, a first carrying means on said base mounted for pivoting about a first axis, cooperating projections on the first carrying means and the fixture base respectively, allowing the insertion of setting blocks therebetween for accurately locating the first carrying means about the first pivoting axis, means carrying said part support from said first carrying means for pivoting about an axis which is perpendicular to the first mentioned axis, which means includes a projecting arm, a projection on the first carrying means cooperating with said arm and allowing the insertion of setting blocks therebetween to accurately position the part support about the second mentioned pivot axis, a gauging member having a surface controlled element, a mount carried on said base for translatory movement, said mount having an end face thereon, a projection on the fixture base cooperating with this end face allowing the insertion of setting blocks therebetween for accurately positioning the mount in its translatory movement, said mount including a pedestal thereon, a component carried for movement along said pedestal and having an end face thereon, a face on the mount opposing said component endface allowing the insertion of setting blocks therebetween for accurately positioning the component along the pedestal with respect to the base, a hole through the component, the gauging member being carried in said hole, cooperating opposed surfaces on the gauging member and the movable component whereby the gauging member can be accurately positioned along the hole by insertion of setting blocks between the opposed surfaces, whereby the part support and the gauging member can be relatively pivoted and translated for gauging purposes, the mounting hole also being adapted to allow the insertion of a scribing element therethrough.

2. A method for calibrating the relative dispositions of selected non-coplanar points on the non-arcuate curved surface of a part, thus adapting the part for use as a master in setting up gauging apparatuses, the method comprising the steps of locating a gauging member having a part controlled element in an initial setting by relatively positioning the gauging member and the part to obtain a gauging indication along a measuring coordinate passing through the part surface and at a first selected point therealong, then for a second point, precisely relatively positioning the part and the gauging member through predetermined rectilinear displacements and predetermined relative rotation to arrange the gauging member at the disposition of the second point about the part surface and align it along a measuring coordinate intersecting the part surface at the theoretical location of the second point therealong, gauging the position of the second point along the measuring coordinate, and marking the surface of the part about but not on each of point locations along the part surface.

3. A method for calibrating a fluid reactant blade of airfoil section at a plurality of reference gauging points along its non-arcuate surfaces for use as a master in conjunction with a gauging apparatus for checking errors in positions of different gauging points along the surface relative to a reference point of the blade whereby the gauging apparatus may be set up with theoretical accuracy for gauging blades at these points by use of a master which itself does not necessarily correspond at the reference gauging points to the dimensions required, the method comprising the application in sequence of a gauging device to each of the reference gauging points for gauging its disposition along a gauging coordinate intersecting the blade surface at an obtuse angle at each of the points along the non-arcuate surface, relatively positioning the blade and gauging device through precise predetermined displacements and relative pivoting as necessary between each application for a predetermined gauging response at the theoretical disposition of the next point being gauged and along a line of measurement at a predetermined angle relative to the blade surface, recording the deviation of the actual gauging response from the predetermined gauging response to define the disposition of each respective point along the gauging coordinate, and marking indicia about but not on the point at the disposition of each reference gauging point therealong to determine the disposition of each point in directions transverse the gauging coordinate.

References Cited in the file of this patent
UNITED STATES PATENTS

| | | |
|---|---|---|
| 1,449,422 | Langa | Mar. 27, 1923 |
| 1,804,421 | Klopsteg | May 12, 1931 |
| 2,214,166 | Hertlein | Sept. 10, 1940 |
| 2,309,142 | Stafford | Jan. 26, 1943 |
| 2,311,234 | Kajnc | Feb. 16, 1943 |
| 2,324,476 | Becker | July 20, 1943 |
| 2,359,018 | Balk | Sept. 26, 1944 |
| 2,386,880 | Osplack | Oct. 16, 1945 |
| 2,452,089 | Wiken | Oct. 26, 1948 |
| 2,495,891 | Davis | Jan. 31, 1950 |
| 2,504,961 | Braaten | Apr. 25, 1950 |
| 2,509,338 | Elliott | May 30, 1950 |
| 2,563,910 | Bean | Aug. 14, 1951 |
| 2,629,936 | Cronstedt | Mar. 3, 1953 |
| 2,648,912 | Osgood | Aug. 18, 1953 |